(12) United States Patent
Lassl et al.

(10) Patent No.: US 7,488,017 B2
(45) Date of Patent: Feb. 10, 2009

(54) IMPACT ENERGY ABSORPTION BLOCK ARRANGEMENT

(75) Inventors: Gunnar Lassl, Bohus (SE); Maurizio Roccato, Moncalieri (IT); Paolo Canato, Candiolo (IT)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/530,132

(22) Filed: Sep. 8, 2006

(65) Prior Publication Data

US 2007/0052260 A1 Mar. 8, 2007

(30) Foreign Application Priority Data

Sep. 8, 2005 (EP) .................................. 05019529

(51) Int. Cl.
*B60R 19/34* (2006.01)

(52) U.S. Cl. .................................. 293/133; 293/134

(58) Field of Classification Search ................ 293/133, 293/136, 155; 296/187.12, 203.03, 187.03, 296/187.05, 187.09

See application file for complete search history.

(56) References Cited

U.S. PATENT DOCUMENTS

| | | | | |
|---|---|---|---|---|
| 3,705,741 A * | 12/1972 | White | ....................... | 293/133 |
| 3,715,139 A * | 2/1973 | Tuggle | ....................... | 293/134 |
| 4,045,009 A * | 8/1977 | Pees | ....................... | 267/139 |
| 4,054,311 A * | 10/1977 | Gute | ....................... | 293/134 |
| 4,054,312 A * | 10/1977 | Strader, Jr. | ................... | 293/134 |
| 4,097,080 A * | 6/1978 | Petry | ....................... | 293/134 |
| 4,109,367 A * | 8/1978 | Richard, Jr. | ................... | 29/436 |
| 4,272,114 A * | 6/1981 | Hirano et al. | ............... | 293/133 |
| 4,328,986 A * | 5/1982 | Weller et al. | ................ | 293/120 |
| 4,348,042 A * | 9/1982 | Scrivo | ........................ | 293/120 |
| 4,482,180 A * | 11/1984 | Huber et al. | ................. | 293/120 |
| 5,150,935 A * | 9/1992 | Glance et al. | ............... | 293/136 |
| 5,564,744 A * | 10/1996 | Frost | ........................... | 280/751 |
| 5,927,786 A * | 7/1999 | Kawai et al. | ................ | 296/39.1 |
| 5,938,273 A * | 8/1999 | Williams et al. | ........ | 296/187.05 |
| 6,059,342 A * | 5/2000 | Kawai et al. | ................ | 296/39.1 |
| 6,254,172 B1 * | 7/2001 | Takahara | ............... | 296/187.05 |
| 6,276,483 B1 * | 8/2001 | Sinnhuber et al. | ........... | 180/274 |
| 6,312,028 B1 * | 11/2001 | Wilkosz | ...................... | 293/133 |
| 6,554,350 B2 * | 4/2003 | Takahara | ............... | 296/187.05 |
| 6,676,200 B1 * | 1/2004 | Peng | .......................... | 296/204 |
| 6,913,300 B2 * | 7/2005 | Mori et al. | ................... | 293/120 |
| 7,029,044 B2 * | 4/2006 | Browne et al. | .............. | 293/137 |
| 2002/0177934 A1 * | 11/2002 | Yokota et al. | ................ | 701/45 |

(Continued)

FOREIGN PATENT DOCUMENTS

DE 197 21 698 A1 11/1998

(Continued)

*Primary Examiner*—Kiran B. Patel
(74) *Attorney, Agent, or Firm*—O'Brien Jones, PLLC

(57) ABSTRACT

There is provided a vehicular impact energy absorption block arrangement adapted to provide impact energy absorption at a region substantially between a first strengthening member and a second strengthening member of a road vehicle. The energy absorption block arrangement comprises one or more energy absorber blocks operable to suffer deformation, for example substantially non-elastic deformation, when subject to forces arising from an impact or crash of the vehicle, thereby at least partially absorbing the impact energy. The one or more energy absorber blocks are fabricated from expanded plastics material foam, for example expanded polypropylene plastics material foam including pores therein. The pores may be substantially opened or closed.

20 Claims, 12 Drawing Sheets

U.S. PATENT DOCUMENTS

| | | | |
|---|---|---|---|
| 2006/0145490 A1* | 7/2006 | Yamaguchi et al. | 293/109 |
| 2007/0052260 A1* | 3/2007 | Lassl et al. | 296/187.12 |
| 2007/0063543 A1* | 3/2007 | Roccato et al. | 296/187.08 |
| 2007/0132223 A1* | 6/2007 | Scheffzuek | 280/784 |

FOREIGN PATENT DOCUMENTS

| | | |
|---|---|---|
| DE | 103 31 862 A1 | 2/2005 |
| EP | 1 104 857 A | 6/2001 |

\* cited by examiner

IMPACT ENERGY ABSORPTION BLOCK ARRANGEMENT

TECHNICAL FIELD

The present invention relates to impact energy absorption block arrangements, namely block arrangements which are operable to absorb kinetic impact energy by undergoing deformation, for example substantially non-elastic deformation. Moreover, the present invention also relates to impact absorption structures including aforesaid impact energy absorption block arrangements. Furthermore, the invention concerns methods of providing impact energy absorption.

BACKGROUND OF THE INVENTION

In contemporary road vehicles, personal safety has become an increasingly important issue to drivers and passengers of such vehicles. Of particular concern regarding safety is damage resulting from frontal and lateral vehicle impacts. One conventional approach to render vehicles more resistant to impacts and crashes is by enhancing the structural strength of such vehicles. Such structural strength enhancement can be achieved by including strengthened frames in vehicles, for example by including horizontal strengthening sills, roof sills, transverse strengthening members and so forth. However, analysis of vehicle accidents has shown that structural strength enhancement alone does not provide an optimal solution as kinetic energy in crash situations has to be dissipated somewhere and, when not absorbed, can have unpredictable effects as momentum is transferred between vehicles involved in crashes, for example vehicles involved can roll or jack-knife potentially into paths of other vehicles. It is therefore conventional practice to try to absorb at least some kinetic energy in crash situations, for example by including crumple zones within vehicles. Whereas crumple zones can be conveniently included in front regions of vehicles, for example in front engine compartments where there is often free space, it is generally not so straightforward to design crumple zones for coping with lateral vehicle impacts and crashes. Such lateral vehicle impacts and crashes are not uncommon, especially at road junctions and at traffic lights when vehicle drivers have not been sufficiently attentive.

Various approaches have been conventionally adopted for providing lateral crash energy absorption in vehicles. For example, in a published European patent application no. EP 1 134 148, there is described a frame structure for a vehicle. The frame structure is alleged to be capable of increasing collision energy absorption and includes a floor member with extruded side sill members which are adapted to undergo a lateral buckling response to side collisions whilst resisting axial or longitudinal deformation due to end-on collisions. The sill members are orientated with their elongate axes substantially running from a front region of the vehicle to a rear region thereof.

As a further example of conventional approaches to coping with lateral impact in vehicles, a published United Kingdom patent application no. GB 2 392 652 describes side-panel occupant protection. In such protection, a vehicle side door comprises an inner trim panel, an outer panel and a pusher block arrangement. The pusher block arrangement is aligned with a pelvic region of an occupant of the vehicle. The pusher block is operable to be displaced towards the occupant if the outer panel is deformed due to a side impact. An air bag is provided for inflation into a region between the trim panel and the pelvic region of the occupant so as to transfer the load, in an impact, from the pusher block arrangement to the occupant for moving the occupant away from the door. Optionally, the pusher block arrangement comprises two separate components, namely an inner block and an outer block. The blocks are optionally fabricated from an energy-absorbing material such as a foam.

Although such conventional approaches for absorbing kinetic energy in impact or crash situations are alleged to be of benefit, they are potentially not capable of providing an adequate degree of kinetic energy absorption in many contemporary vehicles, for example in open-top vehicles. Such lack of protection against lateral impact represents a technical problem, for example when vehicles with relatively elevated chassis height such as SUVs (sport utility vehicles), vans and trucks impact into road vehicles with relatively lower chassis heights.

Thus, the present invention is concerned with providing improved impact energy absorption, for example by way of advanced energy absorption structures.

SUMMARY OF THE INVENTION

An object of the invention is to provide improved impact energy absorption in vehicles by way of employing an energy absorption block arrangement.

According to a first aspect of the present invention, there is provided a vehicular impact energy absorption block arrangement adapted to cooperate in operation at a region substantially between a first strengthening member and a second strengthening member of a road vehicle to provide impact energy absorption thereat. The energy absorption block arrangement comprises one or more energy absorber blocks operable to undergo deformation when subject to forces arising from an impact or crash of the vehicle, thereby at least partially absorbing the impact energy.

One advantage of the energy absorption block arrangement is its capability of efficiently absorbing impact energy and therefore reducing damage to other parts of the vehicle. The expression "adapted to" should be construed to mean that the block arrangement includes one or more features for rendering it capable of providing energy absorption within road vehicles.

In a preferred embodiment, the one or more energy absorber blocks are operable to undergo substantially non-elastic deformation to at least partially absorb the impact energy. The one or more blocks may include a first energy absorber block adapted to be mounted in a region between an end of the first member and a side of the second member to provide an abutment therebetween.

Furthermore, the one or more blocks may include a second energy absorber block adapted to be located within the second member substantially adjacent to the first energy absorber block. Such a combination of energy absorber blocks is found to be especially beneficial on account of the second energy block having focused therein impact forces and the first energy block providing energy absorption and rigidity which ensures that the impact forces continue under impact to remain focused into the second block.

Preferably, the one or more energy absorber blocks are implemented as a unitary absorber block adapted to be mounted in the region between an end of the first member and to extend to within the second member. Use of such a unitary absorber block is potentially capable of simplifying manufacture of the vehicle. Moreover, the unitary block is susceptible to being designed to render it optional to include a cover arrangement to maintain the unitary block in position during operation in crash or impact situations. For example, the unitary block may includes a projection adapted to locate into an aperture provided at the end of the first member to assist to maintain the unitary block in position to absorb impact energy in a crash or impact situation.

In a preferred embodiment, the energy absorber block arrangement is adapted to cooperate with a cover arrangement for maintaining the energy absorber block arrangement in position during impact. Such a disposition is of advantage in that the cover arrangement is operable to deform as the one or more energy absorber blocks deform under impact, but nevertheless remain sufficiently intact to ensure that the energy absorber block arrangement does not become dislodged.

The impact energy absorption block arrangement may be adapted to provide impact energy absorption when the first and second members are disposed substantially mutually perpendicularly. Mutually perpendicular structure members are encountered in road vehicles, for example, in lateral sides of the vehicles which are potentially vulnerable to lateral impact, for example from sports utility vehicles (SUVs), vans, lorries, trucks and similar.

Preferably, the second energy absorber block is adapted to be located so that its center is in operation at a height substantially similar to that of an upper peripheral edge of the first member whereat it is joined to the second member, the upper peripheral edge being subject to a concentration of impact forces during impact situations. Such a disposition of the second energy absorber block is of benefit in that impact forces are efficiently focused in operation into the second block.

The first absorber block is adapted to be maintained substantially in position during impact by a first cover included within the cover arrangement, and the second absorber block is adapted to cooperate with a strengthening element included in the cover arrangement at a periphery of the first cover for focusing in operation an impact force borne by the first member during impact substantially at a center of the second absorber block.

Preferably, the strengthening element is implemented as a strengthening bracket. More preferably, the strengthening element is integral with the first cover.

The cover arrangement is adapted to be maintained in position within the vehicle by way of fasteners, for example bolts. Use of fasteners circumvents a need to employ welding which is often utilized in vehicle manufacture, thereby circumventing exposing the one or more absorber blocks to overheating effects. More preferably, the cover arrangement is adapted to be retained in position in operation by the fasteners at peripheral edges thereof.

Preferably, in the impact energy absorption block arrangement, the cover arrangement is fabricated from sheet metal which is cut and bent into required forms.

Preferably, in the impact energy absorption block arrangement, the one or more absorber blocks are fabricated from plastics material including one or more of: a polyolefin, such as a polyethylene and a polypropylene; a styrene resin such as polystyrene; an ABS resin; a polyester resin such as a polyethylene terephthalate and a polyamide; and a polypropylene. Such materials deployed as expanded plastics material foams are found to be especially suitable for absorbing impact energy by undergoing elastic deformation. Moreover, in more extreme crash situations, such expanded plastics material foams are susceptible to undergoing substantially non-elastic deformation and thereby absorbing greater amounts of impact energy.

Preferably, in the impact energy absorption block arrangement, the one or more absorber blocks are fabricated from expanded plastics material including air- or gas-filled pores therein. More preferably, the pores are substantially open pores; alternatively, the pores are substantially closed pores. Impact energy is dissipated in crushing walls of the pores, thereby causing the pores to collapse. Closed pores are potentially instantaneously capable of providing greater resistance to crushing forces.

Preferably, in the impact energy absorption block arrangement, the one or more absorber blocks are fabricated from expanded plastics material foam having a density in range of 80 grammes/liter to 100 grammes/liter in expanded state. Such a range of densities is found, for example by performing experiments, to be especially suitable for providing a degree of energy absorption encountered in vehicle collision and impact situations. More preferably, in the impact energy absorption block arrangement, the one or more absorber blocks are fabricated from expanded polypropylene foam having a density of substantially 91 grammes/liter in expanded state.

Preferably, in the impact energy absorption block arrangement, the one or more absorber blocks include a first absorber block having a generally tapered form, the tapered form being adapted to be thickest in a portion of the first block which in operation is adapted to abut onto the second member and thinnest in a portion of the first block which in operation is adapted to abut onto an end of the first member.

Preferably, in the impact energy absorption block arrangement, the one or more absorber blocks include a first absorber block of a substantially cubic profile adapted in operation to abut onto the first member.

Preferably, in the impact energy absorption block arrangement, the first absorber block has an overall length when installed along a longitudinal axis of the transverse member of substantially in a range of 200 mm to 300 mm, a height of substantially 200 mm and a width of substantially 200 mm.

Preferably, in the impact energy absorption block arrangement, the one or more absorber blocks include a second absorber block adapted to be mounted onto a mounting ridge within the second member. Such a manner of mounting the second absorber block not only is efficient on assembly time when manufacturing the vehicle but also is effective at maintaining the second absorber block in position during impact. More preferably, the second absorber block includes a slot for cooperating with the mounting ridge, the slot having a depth in a range of 15 mm to 35 mm, and a width in a range of 5 mm to 10 mm. Yet more preferably, the slot has a depth of substantially 28 mm, and a width of substantially 7.5 mm.

Preferably, in the impact energy absorption block arrangement, the second absorber block is of generally rectangular or substantially cubic form. Optionally, the second absorber block has an oblique face on its lower side adjacent to its slot.

Preferably, in the impact energy absorption block arrangement, the second absorber block has a length in a range of 150 mm to 250 mm, a height in a range of 100 mm to 160 mm, and a width in a range of 50 mm to 120 mm. More preferably, the second absorber block has a length of substantially 174 mm, a height of substantially 129 mm and a width of substantially 78 mm. Such a size range for the second absorber block is found to be an optimal selection between complying with general size of spaces available within lateral sides of road vehicles and yet providing a sufficient volume of block available for deformation, for example for substantially non-elastic deformation, to absorb magnitudes of impact energy encountered in lateral impact and crash situations.

According to a second aspect of the invention, there is provided a method of absorbing impact energy in a road vehicle, the vehicle including an impact energy absorption block arrangement for providing impact energy absorption at a region substantially between a first strengthening member and a second strengthening member of the vehicle, the impact energy absorption block arrangement comprising one or more energy absorber blocks adapted to be maintained substantially in position during impact. The method comprises the steps of receiving lateral impact forces at the vehicle in a crash or impact situation; and concentrating the lateral impact forces using the cover arrangement into the impact energy absorption block arrangement to cause the one or more absorber blocks to deform so as to absorb kinetic energy associated with the impact forces.

Preferably, the one or more absorber blocks are operable to substantially non-elastically deform to absorb the kinetic energy associated with the impact forces.

It will be appreciate that features of the invention are susceptible to being combined in any combination without departing from the scope of the invention as defined by the appended claims.

BRIEF DESCRIPTION OF THE DRAWINGS

By way of example only, embodiments of the invention will now be described with reference to the accompanying drawings wherein.

DETAILED DESCRIPTION OF PREFERRED EMBODIMENTS

Figure 1A:
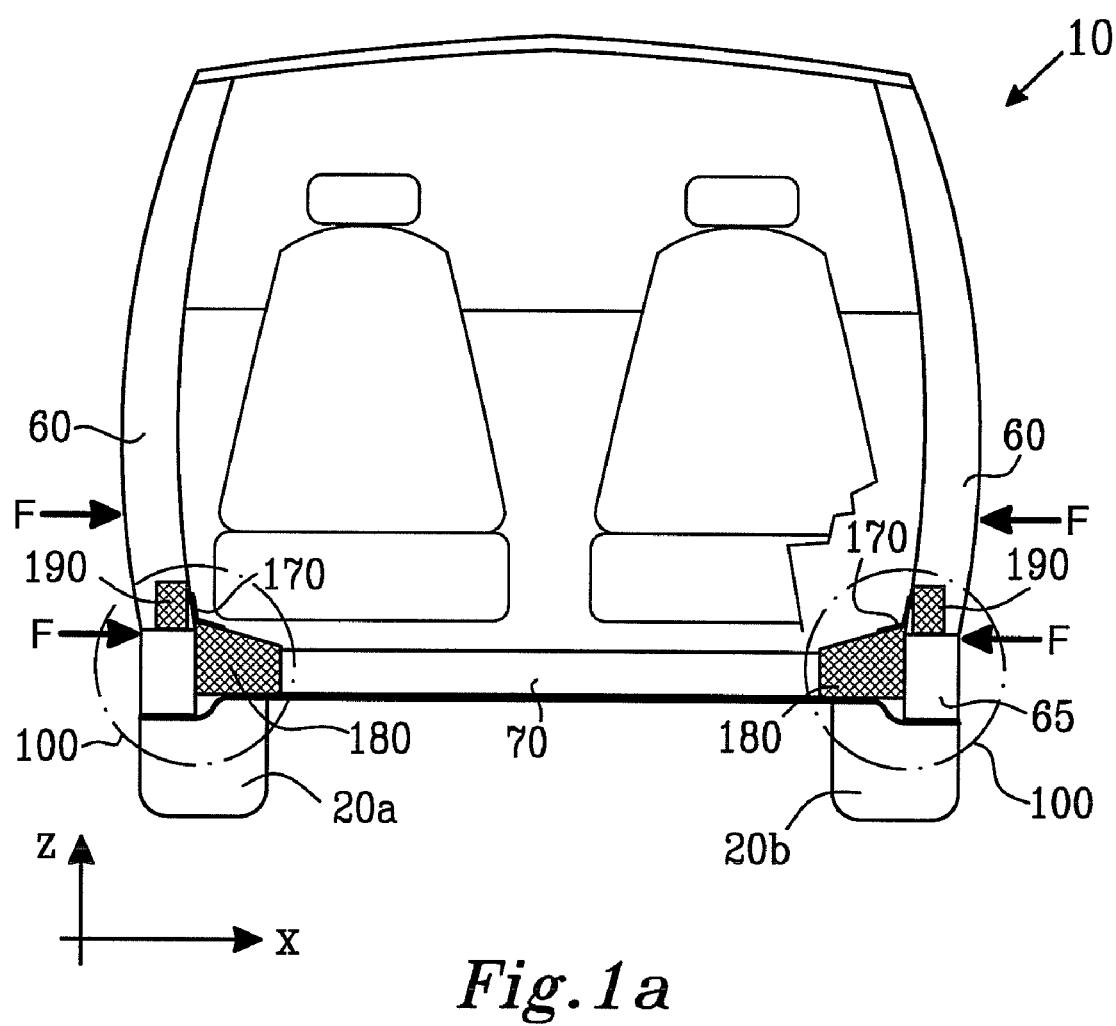
FIGS. 1a, 1b are schematic end and plan views respectively of a vehicle provided with two lateral strengthening sills, with a transverse member, and two substantially vertically-orientated strengthening structures.

In order to provide contemporary vehicles with sufficient strength to withstand impacts and crashes at relatively higher vehicle speeds, it is conventional practice in vehicle design to employ strengthening sills and hollow elongate members in vehicle bodies. The hollow elongate members are fabricated from metal sheet which is folded and then welded during manufacture. Such hollow elongate members are not only of relatively lighter weight, but are axially strong and can, in worst case such as a severe crash, provide desirable crumpling characteristics when deformed; such crumpling is capable of absorbing impact kinetic energy. In advanced vehicle design, it is beneficial not only to include elongate strengthening members in an axial direction in a vehicle body, namely substantially aligned from a front end of the body to a rear end thereof, but also in a transverse direction so as to provide the vehicle with improved characteristics for coping with lateral impacts.

However, a problem with including such strengthening sills and hollow elongate members is that they inevitably contribute to vehicle weight. Vehicle weight also has a bearing on vehicle fuel economy which is becoming an increasingly significant issue for contemporary vehicle drivers. There therefore arises a problem of providing a vehicle with lighter weight whilst ensuring that it has sufficient structural strength as well as energy absorption properties for coping with impact and crash situations.

The inventors have appreciated that expanded plastics material foams have become commercially available and have found diverse uses from crash helmets to aircraft wing construction where high mechanical strength is desired in combination with low weight; for example, expanded plastics material foams are now employed by many model aircraft constructors on account of their high mechanical strength relative to their density. Moreover, the inventors have further identified that such plastics material foams are susceptible to undergoing non-elastic deformation and thereby absorbing mechanical energy in undergoing such non-elastic deformation.

Plastics material foams, for example for purposes of the present invention, are capable of being fabricated from one or more of the following:

a polyolefin, such as a polyethylene and a polypropylene;
a styrene resin such as polystyrene;
an ABS resin;
a polyester resin such as a polyethylene terephthalate and a polyamide; and
a polypropylene.

For example, expanded polypropylene (EPP) plastics material can be manufactured having a density in a range of 80 grammes/liter to 100 grammes/liter, for example substantially 91 grammes/liter. Such expanded polypropylene plastics material foam has a compressive strength of 0.69 MPa for 25% strain, 0.93 MPa for 50% strain, and 2.08 MPa for 75% strain. Moreover, such expanded polypropylene foam has a tensile strength of substantially 0.97 MPa, and a tear strength of 4.4 grammes/millimeter. During manufacture of such expanded plastics material foam, polypropylene resin is combined with other ingredients in a multi-step process, wherein extruded pellets of polypropylene are expanded to become consistently shaped expanded beads which are then subsequently injected into multi-cavity aluminum molds; pressure and heat are applied to fuse the expanded beads into finished shapes.

A further problem confronted by the inventors is how to best utilize such expanded plastics material foams for providing impact and crash protection in road vehicles, especially with regard to lateral impact protection therein. In overview, the inventors have identified that it is highly desirable in advanced road vehicle design to include features which are susceptible to concentrating impact energy effectively into regions where expanded plastics material foam blocks are included so as to ensure that the blocks are capable of undergoing deformation, for example substantially non-elastic deformation resulting in irreversible compression, so as to absorb kinetic energy associated with impacts or crashes. Surprisingly, the inventors have found that not only do such expanded plastics material foam blocks add relatively little to vehicle weight, but are also highly effective at absorbing mechanical energy, for example by undergoing elastic deformation or even substantially non-elastic deformation.

A further problem considered by the inventors is how to mount expanded plastics material foam blocks into road vehicles so as to be effective at absorbing mechanical energy without the blocks becoming displaced and yet not hinder an energy absorbing function provided by the blocks. As will be elucidated in more detail later, such plastics material foam blocks can either be maintained in position by securing them with a cover arrangement, or by providing the foam blocks with projections, slots or similar features which ensure they remain in position during impact or crash situations to efficiently absorb impact energy.

Figure 1B:
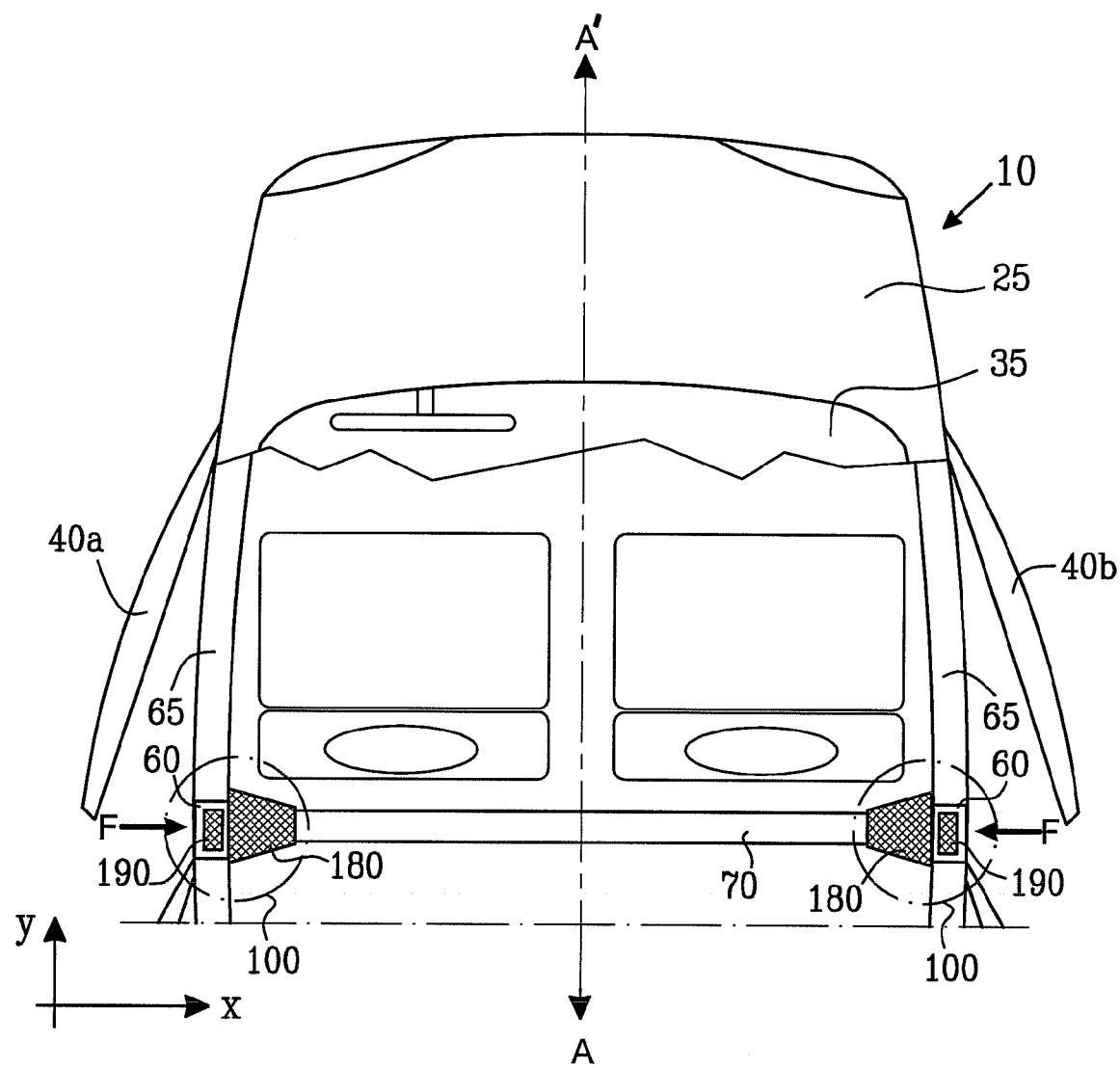

FIGS. 1a and 1b are views whose perspectives are denoted by axes X, Y, Z shown. In FIGS. 1a and 1b, there is illustrated a vehicle indicated generally by 10. The vehicle 10 includes four wheels, for example wheels 20a, 20b, mounted via bearings and suspension to a chassis 25. At a front end of the chassis 25 is mounted an engine coupled to one or more of the wheels. The chassis 25 is further provided with a windscreen 35, two front doors 40a, 40b, and optionally two rear doors (not shown). The vehicle 10 is optionally open-top, in a manner akin to a sports car, although it can alternatively include a permanent metal roof. The front end and a rear end of the vehicle 10 define a principal axis A-A' of the vehicle 10, the principal axis A-A' being substantially parallel to a surface plane of a road surface (not shown) on which the vehicle 10 is operable to travel. At side regions of the vehicle 10 whereat side impacts can potentially occur in operation, there are included substantially vertically-orientated strengthening structures denoted by 60. The strengthening structures 60 can be bodywork parts of the chassis 25, especially when the chassis 25 is of generally welded form. Moreover, the chassis 25 also beneficially includes strengthening sills 65 along side edge peripheries of the vehicle 10. The vehicle 10 also includes a transverse member 70 for providing the vehicle 10 with lateral rigidity. The transverse member 70 is optionally formed using folded and welded metal sheet in a manner as elucidated in the foregoing. Optionally, the transverse member 70 can be formed by indenting a metal floor panel of the vehicle 10 so as to provide a lateral ridge therein; the ridge thus is operable to function as the member 70 and is integral with the floor panel.

The transverse member 70 is operable to provide lateral rigidity and, in extreme crash situations, to crumple to absorb impact kinetic energy. Of particular concern for the present invention is characteristics of regions denoted by 100 under lateral impact conditions wherein a force F is applied to the strengthening structures 60. It is important in the regions 100 that forces arising under impact conditions are correctly coupled to the transverse member 70 and also at least partially absorbed in order to improve survival of a driver and passengers, if present, in the vehicle 10.

Figure 2:
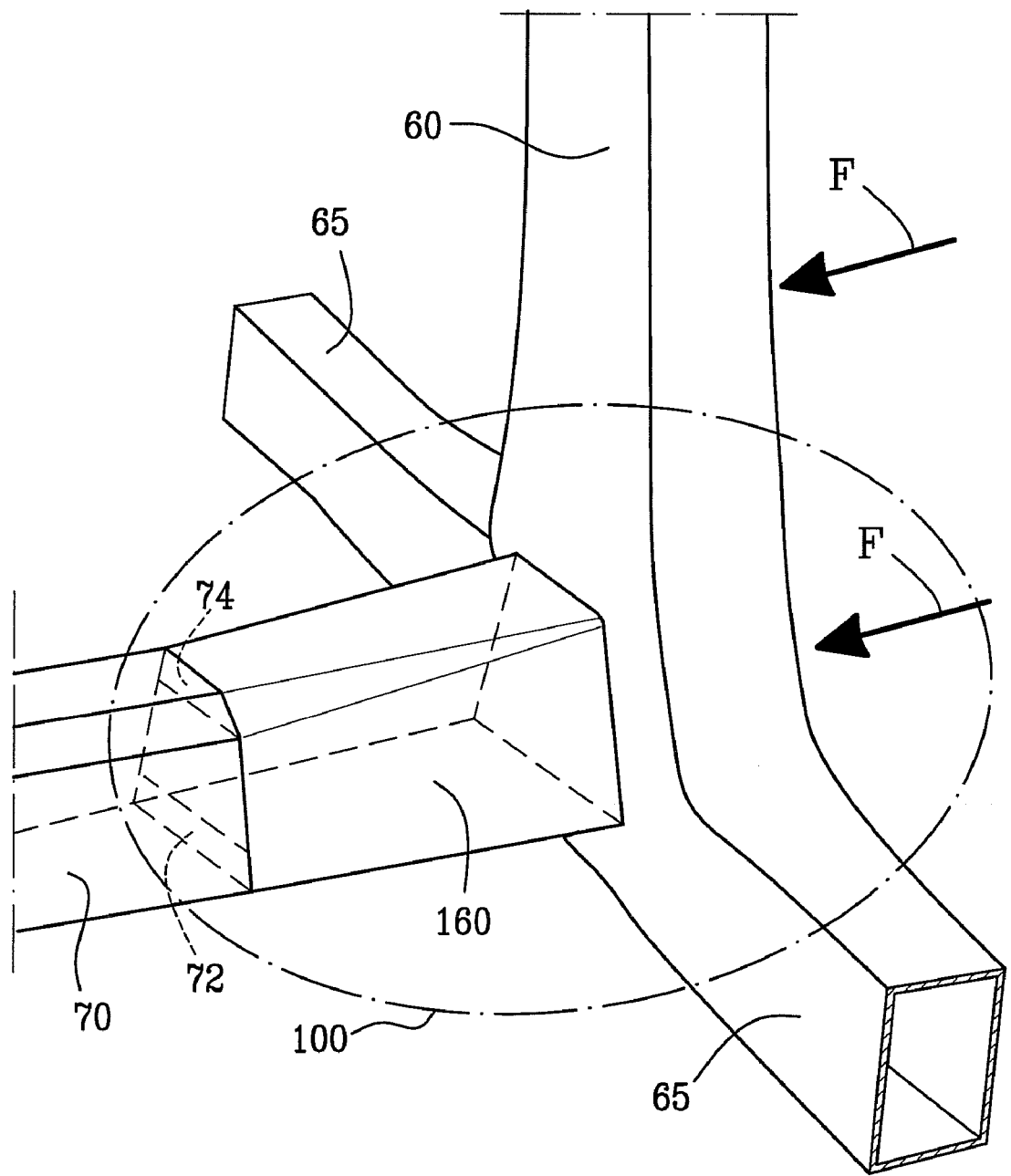
FIG. 2 is a schematic illustration of an interface region of the vehicle of FIGS. 1a and 1b, whereat a substantially vertically-orientated strengthening structure and a lateral strengthening sill mutually abut, an end of the traverse member abuts via an energy absorber block onto the strengthening structure and the sill.

The region 100 is illustrated in greater detail in FIG. 2 in schematic form. The strengthening structure 60 extends substantially vertically upwards a distance, for example, in a range of 150 to 200 mm from a floor height of the vehicle 10. The strengthening structure 60 is, for example, a lower part of a door frame surround of the vehicle 10, the door frame surround accommodating a door 40 of the vehicle 10; for example, the structure 60 is susceptible to forming a part of a "B-pillar" of the vehicle 10. Moreover, the region 100 includes an assembly according to the present invention in a region between an end of the transverse member 70 and a side of the strengthening structure 60 and the aforementioned strengthening sill 65. The end of the transverse member 70 is provided with abutment plates 72, 74 which at least partially cover an end cross-sectional area of the transverse member 70; when the abutment plates 72, 74 partially cover the end cross-sectional area of the transverse member 70, there is effectively provided an open aperture at the end of the transverse member 70. These plates 72, 74 can be welded onto the transverse member 70; alternatively, the plates 72, 74 can be integral and formed from the transverse member 70, for example by bending inwardly one or more projecting end edges of the transverse member 70.

The assembly is represented only schematically in FIG. 2; in practice, the assembly comprises a first expanded plastics material foam energy absorber block mounted at an end region of the transverse member 70 and held in place by a metal cover. The metal cover itself has a further strengthening bracket at an upper region thereof. Optionally, the strengthening bracket is welded to the cover and thereby integral therewith. More optionally, the strengthening bracket can be formed integrally with the cover by folding back a portion of the cover to provide a region of double-thickness metal sheet corresponding to the bracket; spot welding can be used to provide necessary strength where the cover is folded back to generate the bracket. Optionally, the metal cover and strengthening bracket can be integrally molded into the first block to provide a unitary component which is susceptible to simplifying fabrication of the vehicle 10.

Moreover, in conjunction with the assembly, a second expanded plastics material foam energy absorber block is included adjacent the first absorber block within a wall of the vehicle 10 whereat the strengthening structure 60 and the strengthening sill 65 intersect. The metal cover is optionally attachable to the vehicle 10 by way of bolts at its extremities; similarly, the strengthening bracket is also optionally maintained in position by way of bolts at its extremities. Use of bolts avoids a need for welding the metal cover and the strengthening bracket into position in the region 100. The assembly illustrated in FIG. 2 will now be further elucidated with reference to FIGS. 3a and 3b.

Figure 3A:
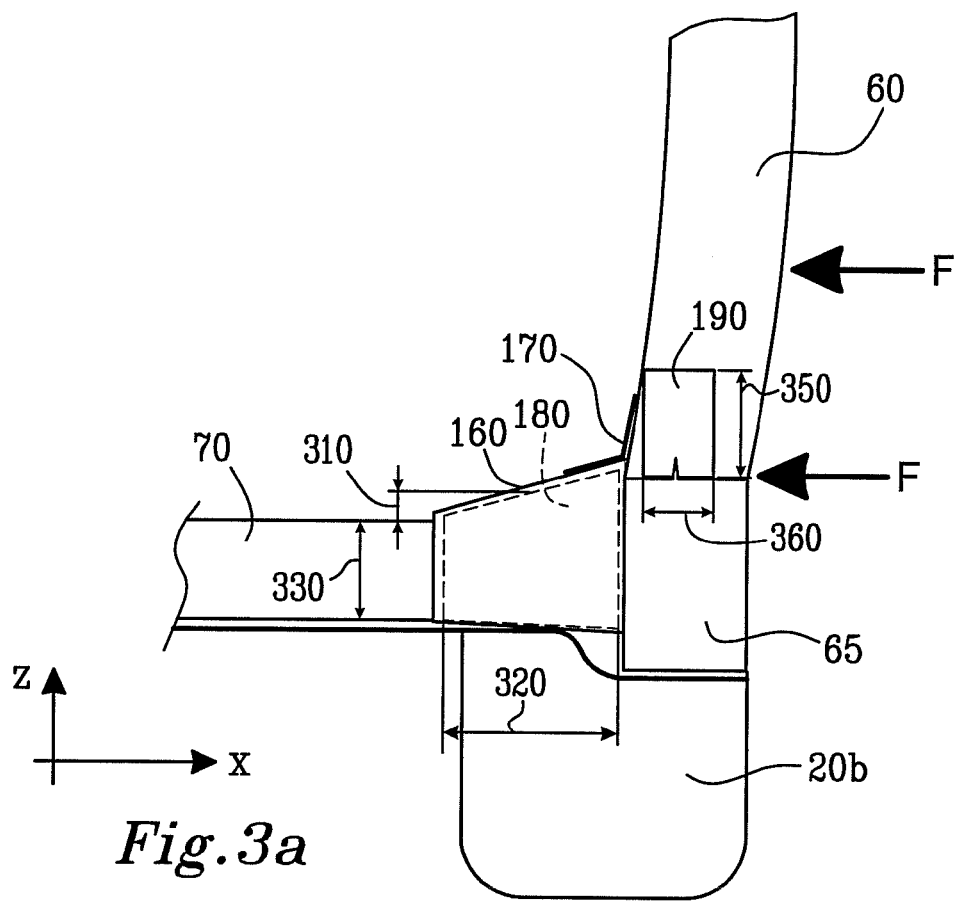
FIGS. 3a, 3b are side and plan schematic illustrations of the interface region of FIG. 2, the interface region provided with a cover, a strengthening bracket, and an arrangement of energy absorption blocks; the arrangement of blocks comprises first and second absorber blocks.
Figure 3B:
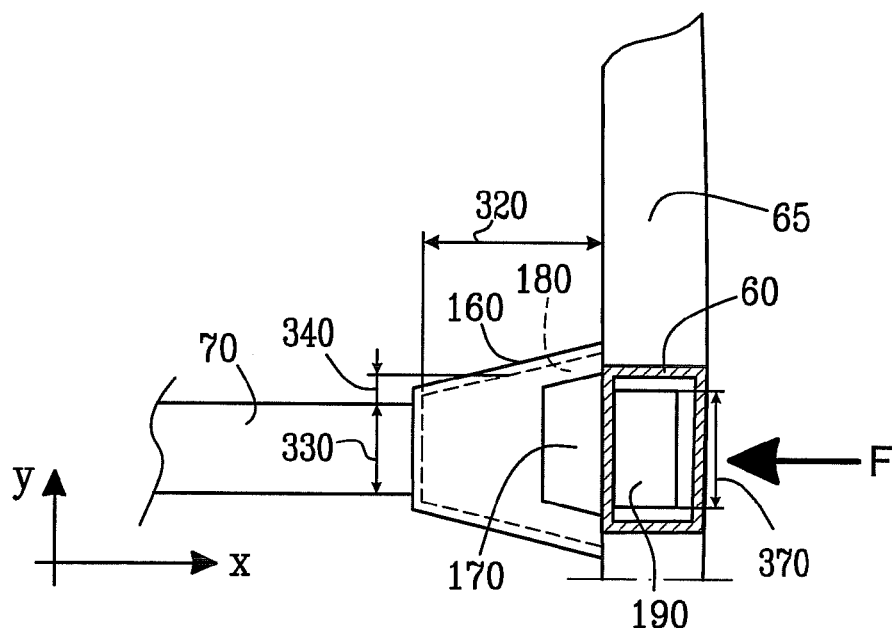

In FIGS. 3a and 3b, the metal cover is denoted by 160. The cover 160 is fabricated from sheet metal by stamping or laser cutting processes to generate a flat blank; the flat blank is then bent or pressed to form it into a required cover shape. The further strengthening bracket is denoted by 170; the bracket 170 is substantially of an "L"-shape cross-sectional profile. The bracket 170 is also fabricated from sheet metal by stamping or laser cutting to provide a flat blank; the flat blank is similarly bent or pressed to form it into a required bracket shape. The cover 160 and is bracket 170 are of a generally tapered form as illustrated, namely widening out towards a junction of the sill 65 and the strengthening structure 60. Housed within the cover 160 is the first energy absorber block denoted by 180, the first block 180 optionally also being of tapered form as illustrated, namely cooperating with the cover 160 and widening out towards the junction of the sill 65 and the strengthening structure 60. Within a region of the aforesaid junction is housed the second absorber block denoted by 190. The second block 190 is positioned at a relatively greater height in the region 100 in comparison to the first block 180 as illustrated in FIG. 3a. The bracket 170 is effective at holding the first block 180 in position during lateral impact conditions. Moreover, the cover 160 is also designed to deform easily under impact conditions but nevertheless hold the first absorber block 180 in position during such impact conditions.

The first block 180 is optionally of an approximately cubic form when installed in the vehicle 10, the first block 180 having a cross-sectional area substantially corresponding to that of an end cross-sectional area of the transverse member 70. Moreover, the first block 180 may be an integral component; alternatively, it can comprise a plurality of sub-blocks which are co-assembled to provide the first block 180. The first block 180 will be elucidated in further detail later, for example with reference to FIG. 8.

The blocks 180, 190 serve to contribute to the global stiffness of the chassis 25 of the vehicle 10 without significantly adding to its weight. Moreover, the blocks 180, 190 are preferably fabricated from expanded plastics material foam having pores therein; they can alternatively, at least in part, be fabricated from an expanded metal foam material including microvoids therein, such metal foam material being susceptible to undergoing non-elastic deformation to absorb impact energy. The pores or microvoids optionally have a nominal diameter in a range of 1 μm to 1 mm. More optionally, the pores or microvoids have a nominal diameter in a range of 10 μm to 500 μm. Yet more optionally, the pores or microvoids have a nominal diameter in a range of 25 μm to 300 μm.

The aforesaid expanded plastics material foam is optionally derived from, for example, at least one of the following:
  a polyolefin, such as a polyethylene and a polypropylene;
  a styrene resin such as polystyrene;
  an ABS resin;
  a polyester resin such as a polyethylene terephthalate and a polyamide; and
  a polypropylene.

For example, the blocks 180, 190 are beneficially fabricated from expanded polypropylene (EPP) plastics material as elucidated in the foregoing. For example, the blocks 180, 190 are beneficially fabricated from expanded polypropylene (EPP) plastics material having a density in a range of 80 grammes/liter to 100 grammes/liter, for example substantially 91 grammes/liter.

During manufacture of the blocks 180, 190, polypropylene resin is combined with other ingredients in a multi-step process, wherein extruded pellets of polypropylene are expanded to become consistently shaped expanded beads which are then subsequently injected into multi-cavity aluminum molds; pressure and heat are applied to fuse the expanded beads into finished shapes for the blocks 180, 190. The plastics material foam used to fabricate the blocks 180, 190 includes air or gas voids therein to provide a material which is relatively light in weight, is strong and also exhibits desired energy absorbing characteristics when being crushed under impact conditions. Moreover, the plastics material foam can be of substantially closed pore nature. Alternatively, the plastics material foam can be of substantially open pore nature.

Figure 10A:
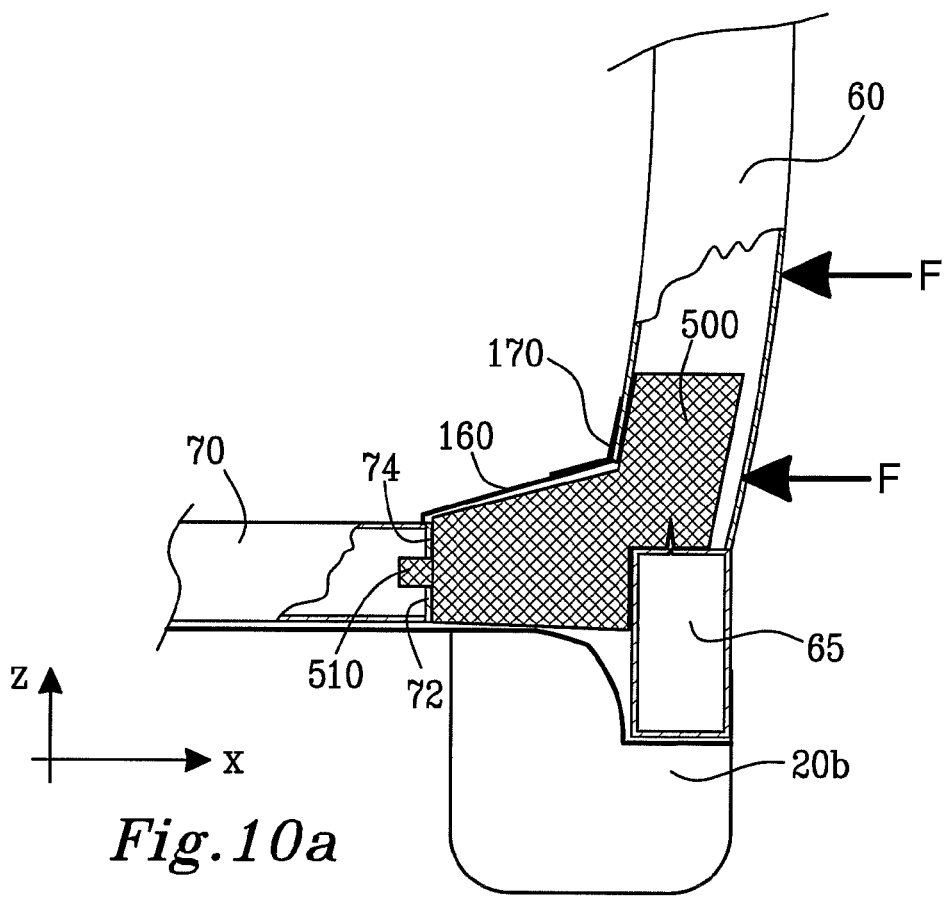
FIGS. 10a, 10b is an illustration of first and second absorber blocks implemented as a unitary absorber block installed within the vehicle.
Figure 10B:
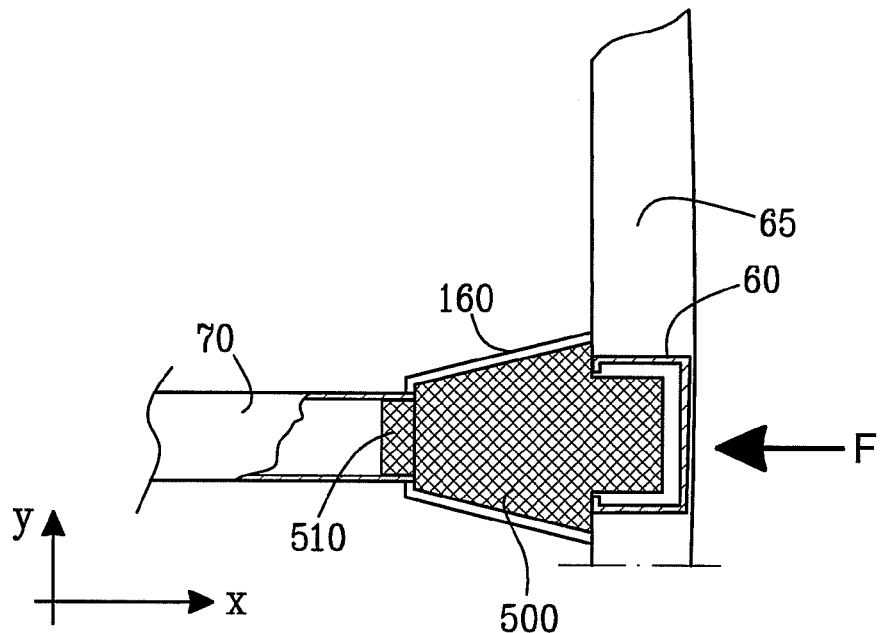
Figure 11:
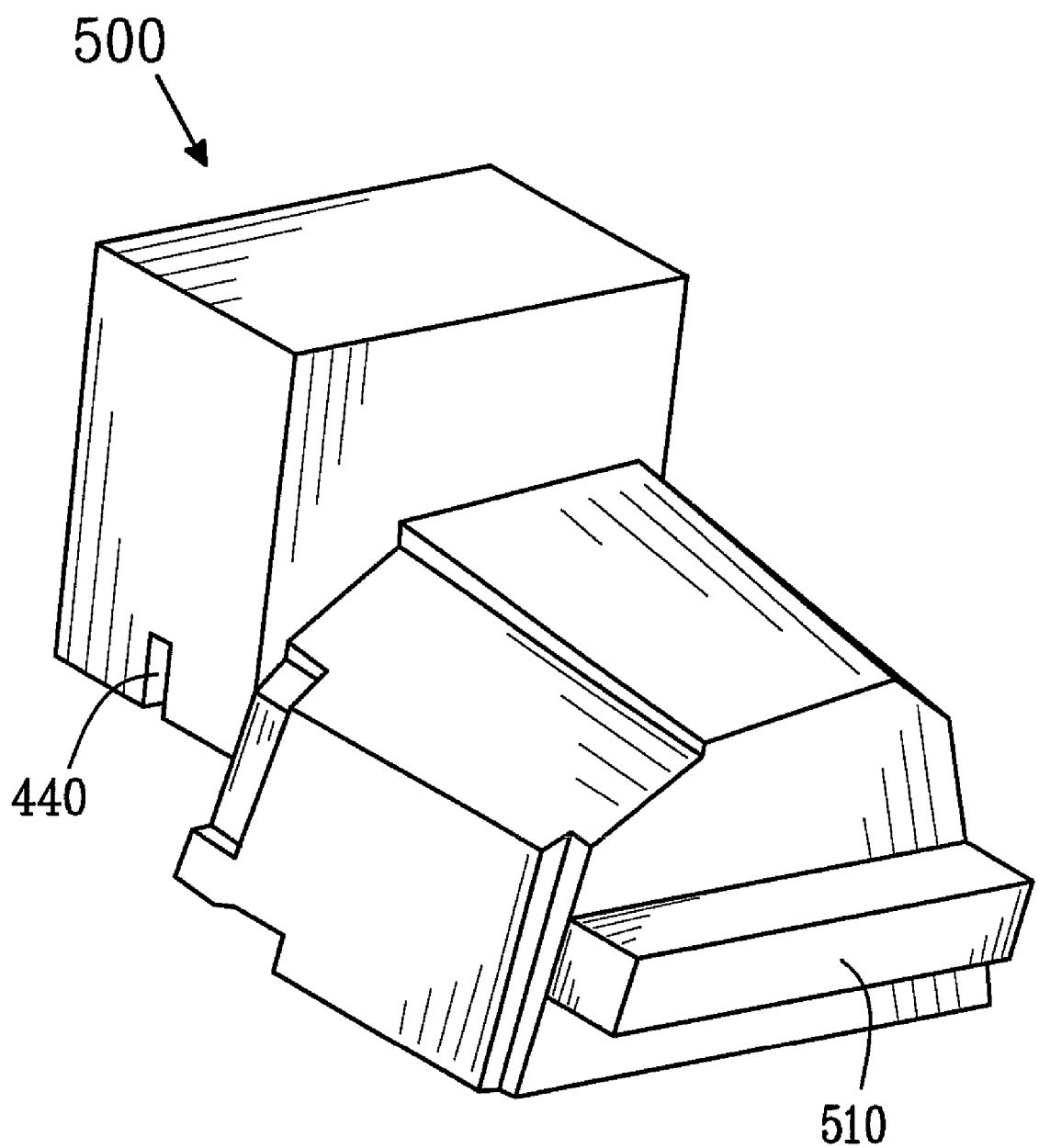
FIG. 11 is a perspective illustration of the unitary absorber block in isolation.

In the foregoing, it will be appreciated that the transverse member 70 is optionally rendered integral with the floor of the vehicle 10. Moreover, optionally, at least one of the cover 160 and the strengthening bracket 170 can be molded into the first block 180 and thereby integral therewith to provide fewer individual parts necessary for fabricating the vehicle 10. Yet more optionally, the second block 190 can be omitted. Yet more optionally, the first and second blocks 180, 190 can be combined together to provide a unitary block adapted to extend in operation from the end of the transverse member 70 into the strengthening structure 60 as illustrated in FIGS. 10a and 10b. In FIGS. 10a, 10b, the unitary block is denoted by 500 and includes a projection 510 for engaging into the end of the transverse member 70, namely into an aperture adjacent to the aforesaid plates 72, 74. The projection 510 is operable to maintain the block 500 in position during impact or crash situations such that the cover 160 and the strengthening bracket 170 can optionally be omitted. The block 500 is also adapted to engage onto a central raised indent ridge 235 as illustrated to provide a positive retention thereto. On account of the strengthening member 60 being rotated under lateral impact conditions, the unitary block 500 is effectively captured into position during impact or crash situations, thereby rendering it possible to optionally omit the cover 160 and the strengthening bracket 170.

Figure 4:
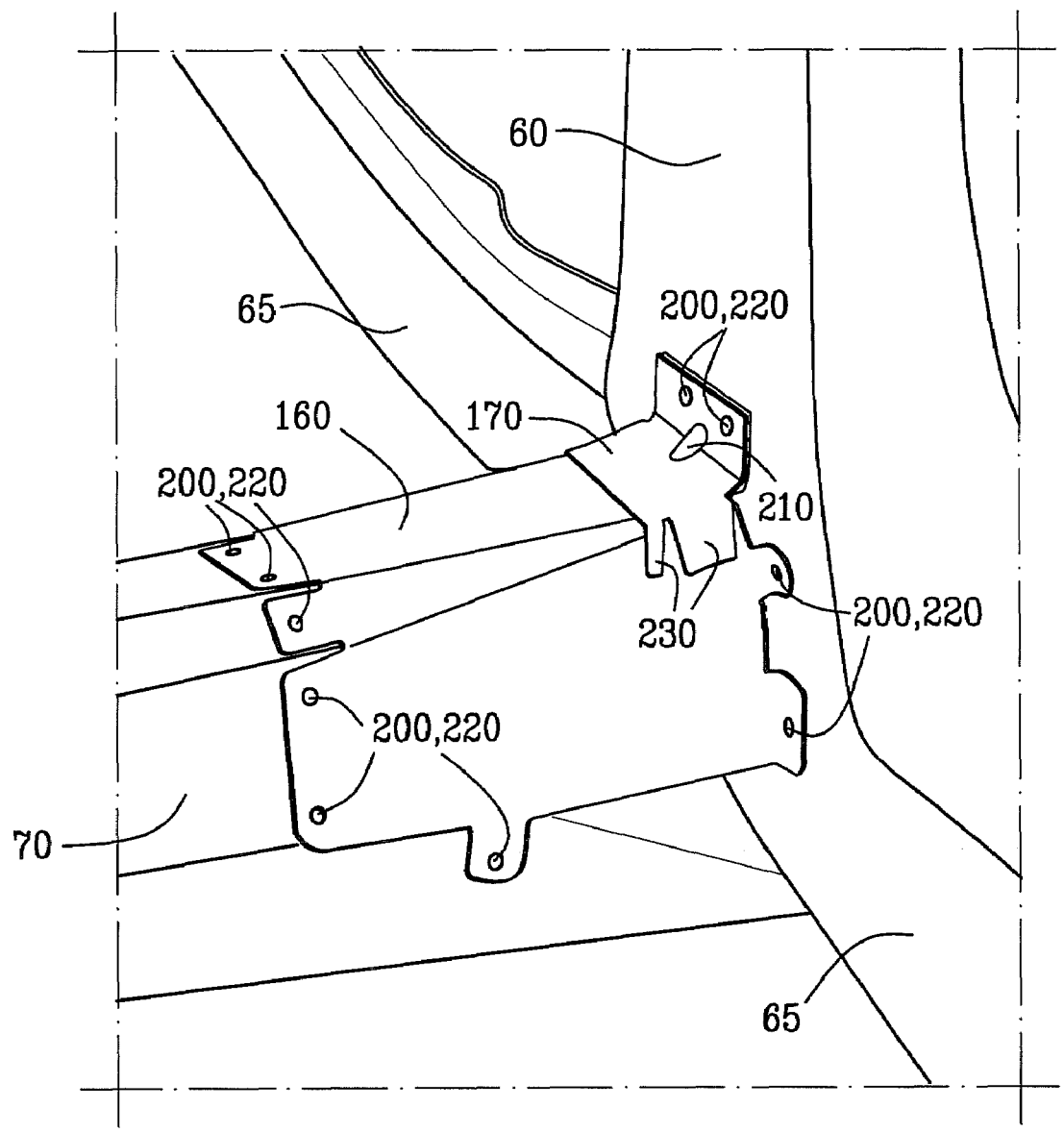
FIG. 4 is a line-diagram representation of a photographic image showing the interface region of FIGS. 2, 3a and 3b in perspective view, the line diagram representation showing the cover with its bolt holes at extremities thereof mounted to the transverse member, and the strengthening member mounted onto the cover at an upper region thereof.
Figure 5:
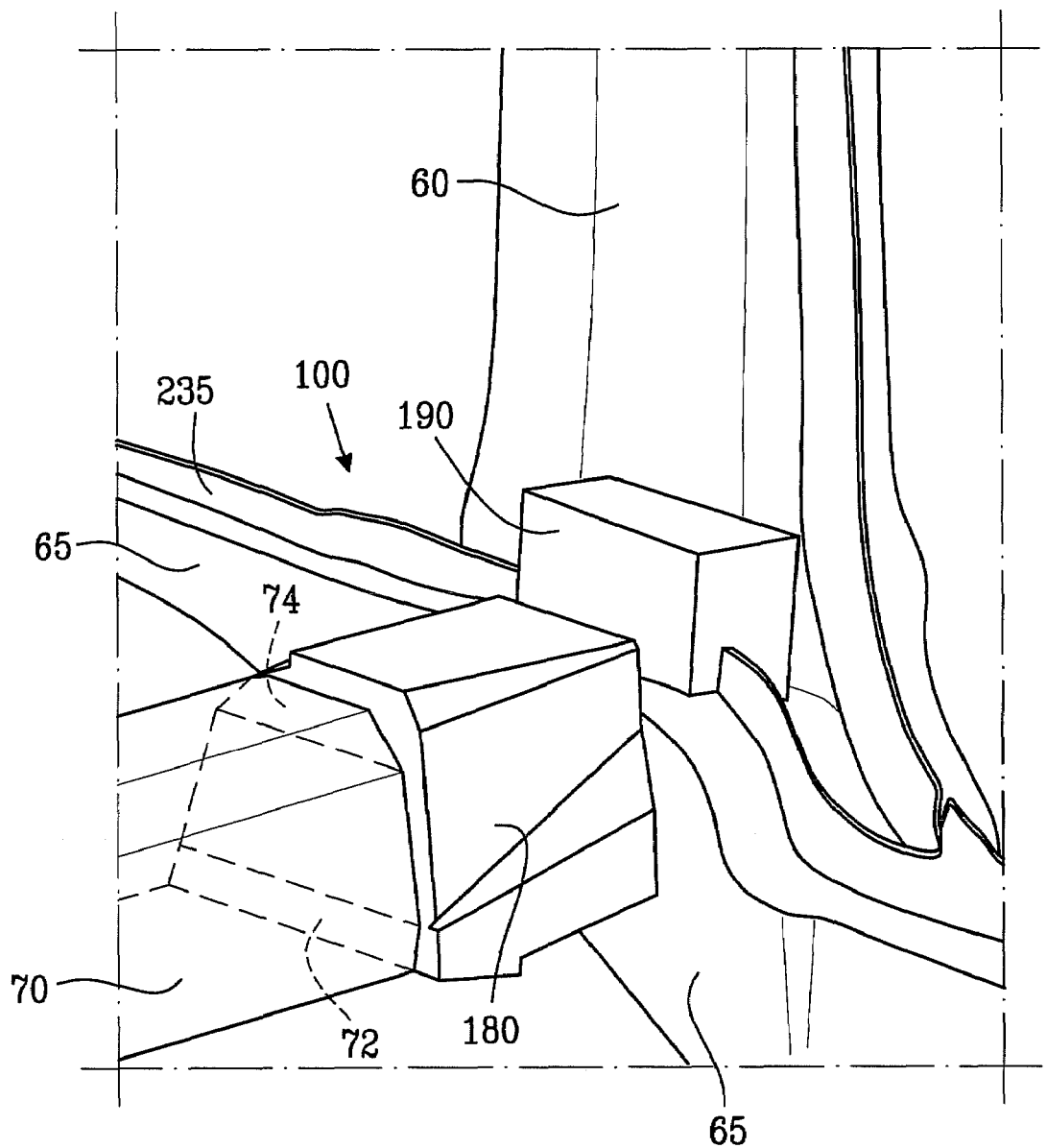
FIG. 5 is a line-diagram representation of a photographic image showing the first and second absorber blocks included at the interface region, the first absorber block mounting at an end of the transverse member and the second absorber member mounting at the substantially vertically-orientated strengthening structure; it is to be noted that some of the vertically-orientated strengthening structure is omitted from the illustration to show the second absorber block more clearly; moreover, the cover and the strengthening bracket are also not shown to improve clarity.
Figure 6:
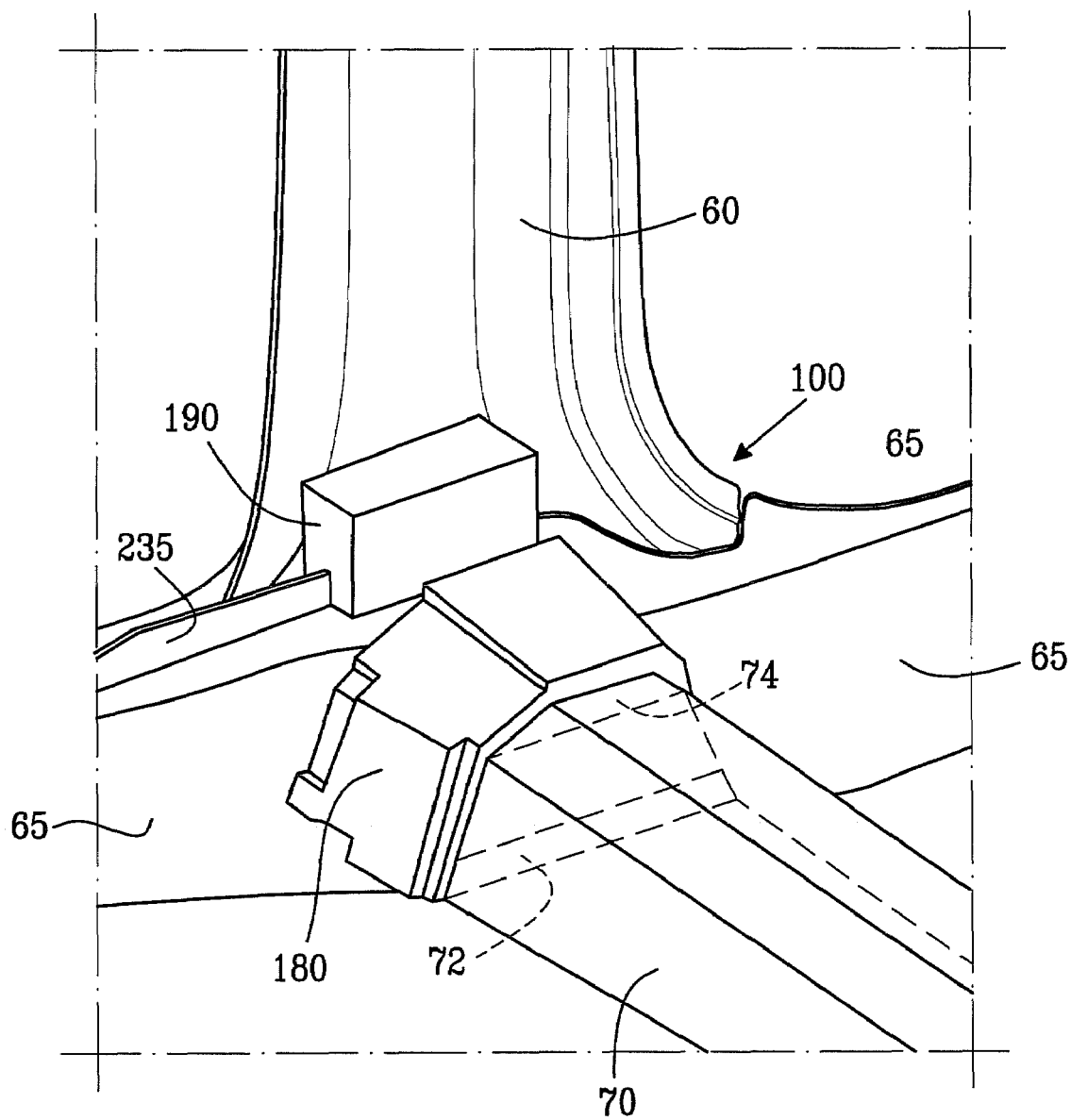
FIG. 6 is another line-diagram representation of a photographic image showing, from another perspective to FIG. 5, the first and second absorber blocks included within the interface region.

More specific details of the cover 160 and the bracket 170 will now be elucidated with reference to FIGS. 4 to 6. In FIG. 4, there is provided an outline diagram of the region 100 derived from a photographic-type image. As illustrated, the cover 160 includes bolt holes 200 at its extremities for securing the cover 160 to the transverse member 70, to the sill 65 and also to the strengthening member 60. As elucidated in the foregoing, the first absorber block 180 is not shown in FIG. 4 on account of being hidden from view beneath the cover 160. The bracket 170 is attached by way of its bolt holes 200 at an upper region of the cover 160 as illustrated; the bolt holes 200 are operable to receive bolts 220 and associated nuts. However, it will be appreciated that the cover 160 and the bracket 170 are capable of being secured in position by alternative fixing arrangements, for example rivets, press-studs, clip inserts and similar types of fasteners. Optionally, the bracket 170 includes a central raised indent ridge 210 to further increase its mechanical strength. The bracket 170 is not itself bolted to the cover 160. Moreover, the bracket 170 includes lateral portions 230 thereof which are bent during manufacture so as to engage onto sides of the cover 160, thereby potentially reducing a tendency for the cover 160 to move laterally in respect of an elongate axis of the transverse member 70 during lateral impact conditions; these lateral portions 230 are present at both sides of the bracket 170. The strengthening bracket 170 is optionally fabricated from thicker sheet metal than employed to fabricate the cover 160.

In FIG. 5, there is provided an outline diagram of the region 100 derived from a photographic-type image. The cover 160 and the strengthening bracket 170 together with a portion of the substantially-vertical strengthening assembly 60 are shown removed so that the first and second absorber blocks 180, 190 are to be more clearly seen. As elucidated earlier, the second absorber block 190 is mounted in the region 100 at a height relatively higher than that of the first absorber block 180 for reasons that will become evident from FIGS. 7a and 7b. In FIG. 6, there is provided a further outline diagram of the region 100 also derived from a photographic-type image. The first absorber block 180 is shown mounted at the end of the transverse member 70. Moreover, an outer surface of the first absorber block 180 is implemented in a facetted manner, namely with a top facet, two diagonal facets, and two side facets. The two diagonal facets are included between the top facet and the side facets as illustrated.

Figure 8:
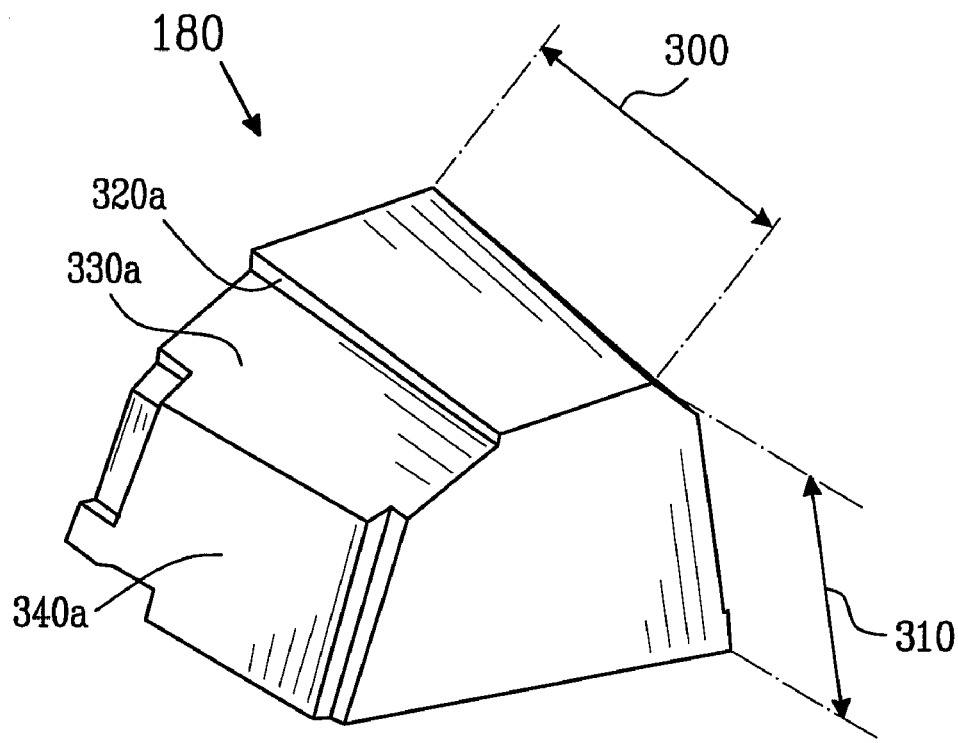
FIG. 8 is an illustration of an implementation of the first absorber block.
Figure 8:
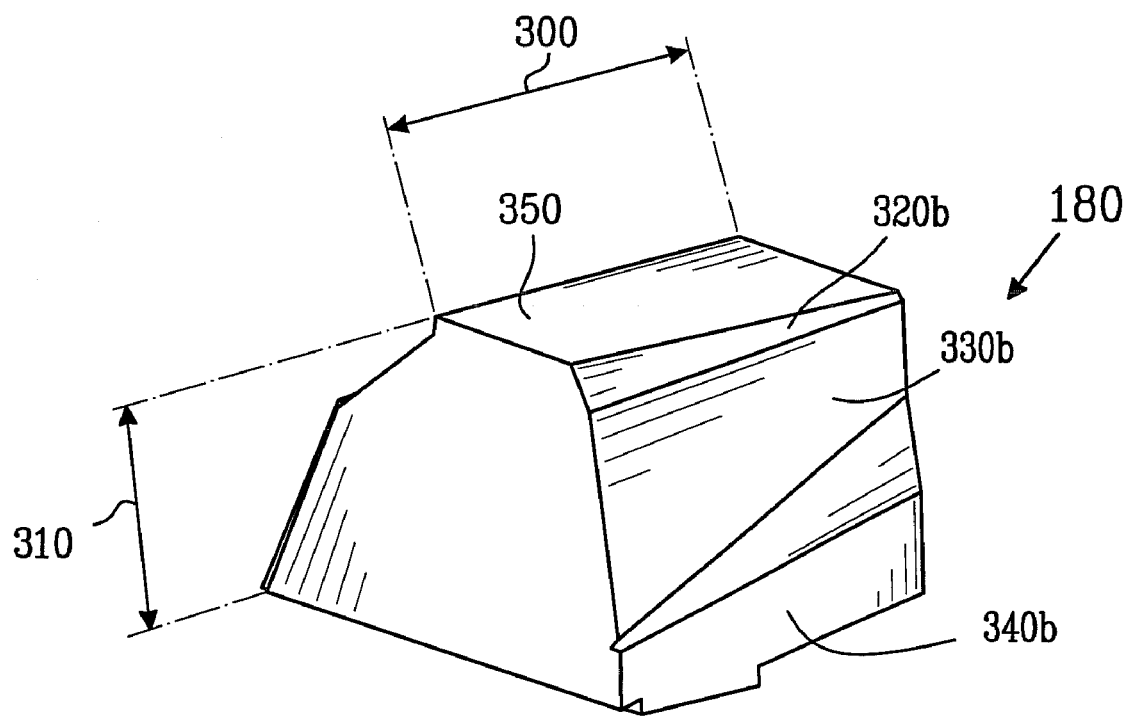

The first absorber block 180 is of generally cubic form with an overall length along a longitudinal axis of the transverse member 70 when installed of substantially 300 mm, a height of substantially 200 mm and a width of substantially 200 mm; more preferably, the first absorber block 180 has an overall length of substantially 285 mm, a height of substantially 188 mm and a width of 174 mm. An embodiment of the first absorber block 180 is illustrated in FIG. 8; the first absorber block 180 is beneficially fabricated from aforementioned expanded plastics material foam, for example expanded polypropylene plastics material foam as elucidated earlier.

Figure 9:
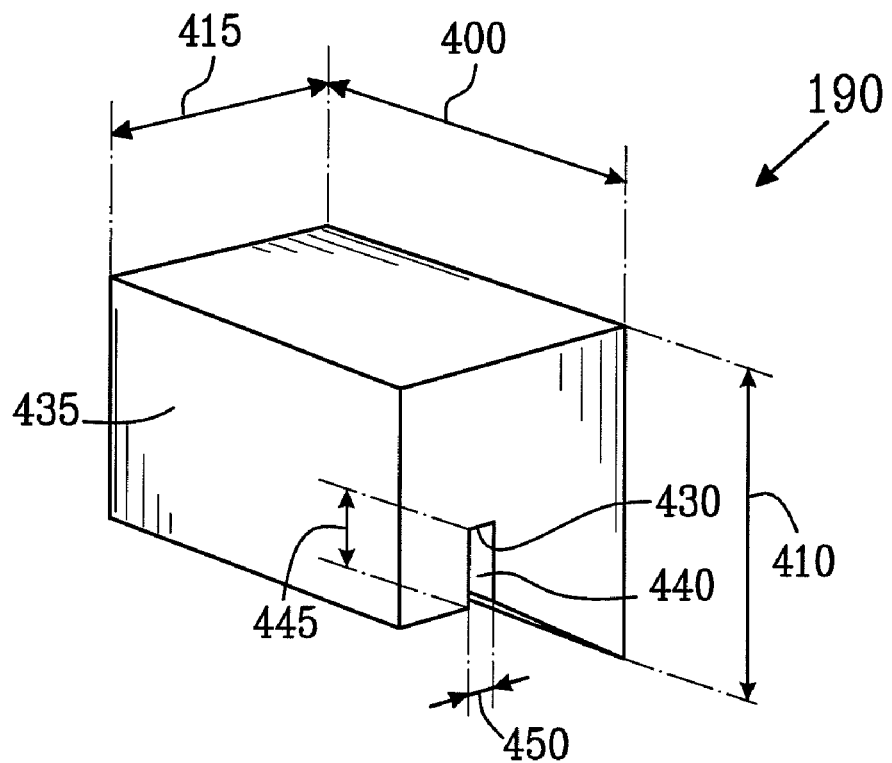
FIG. 9 is an illustration of an implementation of the second absorber block.
Figure 9:
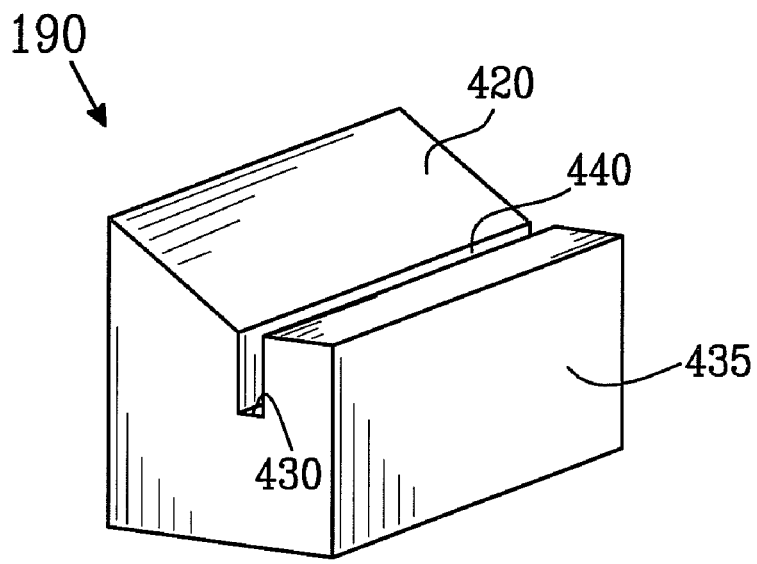

The second absorber block 190 is of generally rectangular or substantially cubic form. Optionally, the second absorber block 190 has a length in a range of 150 mm to 250 mm, a height in a range of 100 mm to 160 mm, and a width in a range of 50 mm to 120 mm. However, other dimensions for the second block 190 are possible therearound. More preferably, the second absorber block 190 has a length of substantially 174 mm, a height of substantially 129 mm and a width of substantially 78 mm. The second absorber block 190 is optionally arranged to be mounted, by way of a linear slot formed along a lower surface of the second block 190, onto the aforesaid metal ridge 235 forming a part of the sill 65 where it intersects with the strengthening structure 60. The linear slot optionally has a depth in a range of 15 mm to 35 mm, and more preferably substantially 28 mm depth. Moreover, the linear slot optionally has a width in a range of 5 mm to 10 mm, more preferably substantially 7.5 mm width. An embodiment of the second absorber block 190 is illustrated in FIG. 9; the second absorber block 190 is beneficially fabricated from aforementioned expanded plastics material foam, for example expanded polypropylene plastics material foam as elucidated in the foregoing.

Figure 7A:
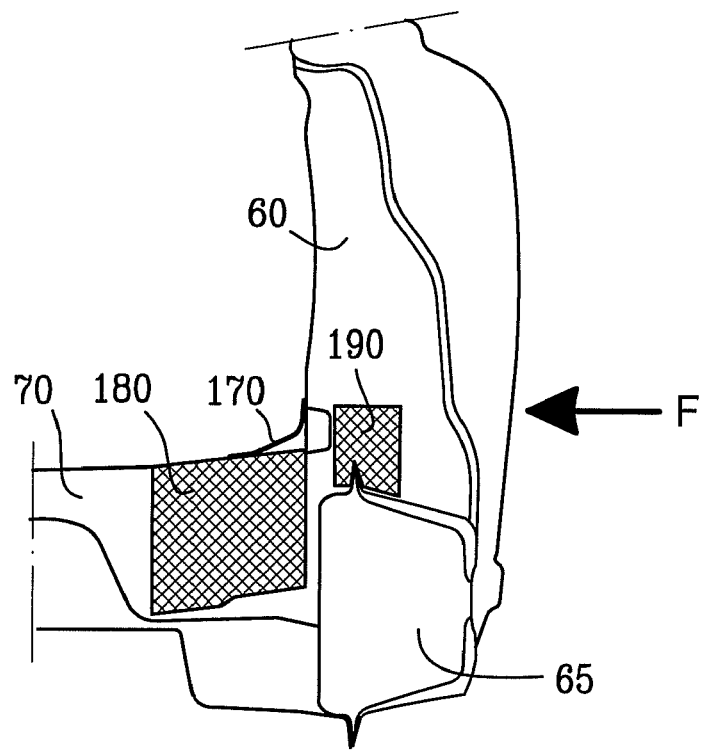
FIGS. 7a, 7b include two cross-sectional views of the interface region before and after being subjected to a lateral impact denoted by a lateral force F, the views showing deformation of the substantially vertically-orientated strengthening structure, as well as the aforesaid first and second absorber blocks.
Figure 7B:
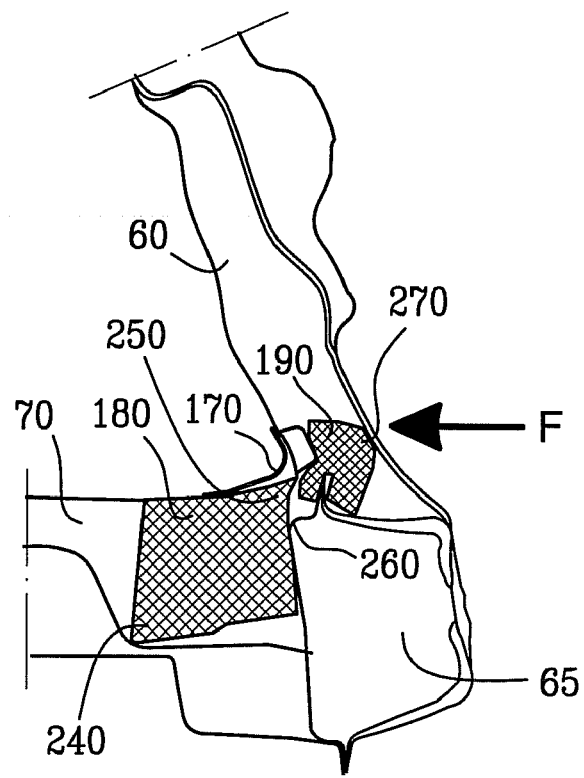

Referring to FIGS. 7*a* and 7*b*, deformation of the region 100 when subjected to the lateral impact or crash force F is illustrated in lateral cross-sectional view. In FIG. 7*a*, the region 100 is shown in an undeformed state, namely the absorber blocks 180, 190 are in their manufactured form, and the strengthening structure 60 is implemented as a cavity surrounded by contoured metal sheets and has its metal sheets mutually spaced apart. A position of application of the aforesaid impact or crash force F is shown as being substantially aligned to a top of the second absorber block 190.

In FIG. 7*b*, the region 100 is shown in a deformed state after application of the force F. Metal sheets of the strengthening member 60 are shown pushed together. The sill 65 is shown slightly rotated around its principal axis causing deformation of the first absorber block 180 whereat a base region 240 of the block 180 most remote from the sill 65 is pushed towards a center of the vehicle 10. Moreover, an upper region 250 of the first absorber block 180 is compressed by an upper edge 260 of the sill 65. Moreover, the second block 190 experiences considerable deformation on account of the metal sheets of the strengthening structure 60 being pushed into the block 190, thereby flattening one of its corners 270. Moreover, forces applied to the second block 190 by the crash or impact are transferred to the upper region 250 of the first block 180 with the strengthening bracket 170 functioning to focus the force from the crash or impact. Such focusing by the bracket 170 enables the first block 180 to absorb the forces rather than them being transferred to the transverse member 70. It will be appreciated that the bracket 170 is included in a strategically beneficial position whereat a considerable turning moment from the strengthening structure 60 is generated under crash or impact situations. In relation to the sill 65, it will be appreciated that the first and second blocks 180, 190 are especially well placed to provide impact energy absorption, the second block 190 providing most significant crash energy absorption and the first block 180 assisting to prevent buckling and crumpling at the end of the transverse member 70.

It will be appreciated that the first and second blocks 180, 190 together with their cover 160 and strengthening bracket 170 are optionally included at both ends of the transverse member 70 as illustrated in FIGS. 1*a* and 1*b*.

Although the absorber blocks 180, 190 have been described in the foregoing with reference to FIGS. 1 to 7*a*, 7*b* as being substantially rectangular or cubic expanded plastics material components, their actual shapes in practice are somewhat more complex. Referring to FIG. 8, the first absorber block 180 is illustrated in greater detail. The first block 180 has a nominal length along an elongate axis of the transverse member 70 when installed in abutment thereto denoted by 300, namely substantially 200 mm, for example 174 mm. Moreover, the first block 180 has a nominal height denoted by 310, namely also substantially 200 mm. It will be appreciated from FIG. 8 that the top facet 350 of the first block 180 progressively widens out to the diagonal and side facets 330*a*, 330*b*, 340*a* and 340*b* respectively as illustrated. Furthermore, the top facet 350 is not of simple rectilinear form but is adapted to at least partially conform in profile to the transverse member 70.

Referring to FIG. 9, the second absorber block 190 is also illustrated to be of more complex shape than elucidated in the foregoing. The second block 190 has a width 400 of substantially 174 mm, a height 410 of substantially 129 mm as measured at an extremity of an oblique lower surface 420, and a depth 415 of substantially 78 mm. An upper edge of the aforesaid slot 440 is denoted by 430 and a front face of the second block 190 is denoted by 435. The slot 440 has a depth 445 of substantially 28 mm and a width 450 of substantially 7.5 mm. Moreover, the slot 440 optionally extends a full length of the second block 190 so that the second block 190 can be resiliently retained on the metal ridge 235. The oblique lower surface 420 enables the second block 190 to conform to an external profile of the sill 65 as shown in FIGS. 7*a* and 7*b*, for example for purposes of proving underside mechanical support for the second block 190.

The assembly included within the region 100, for example as described in the foregoing, is also conveniently referred to collectively as a lateral impact protection structure. The lateral impact protection structure is especially beneficial to employ in open-top vehicles, for example cabriolets, to provide protection against impact from other types of road vehicles whose chassis are at relatively elevated heights, for example as in SUVs (sport utility vehicles), vans, lorries and trucks for example. However, the protection structure is also susceptible to being used in other types of road vehicle where personal safety is important, for example in busses and coaches, where lateral impact or crash mitigation is important in view of the length of such types of road vehicle rendering them potentially especially vulnerable to lateral damage. The protection structure is, for example, also susceptible to being incorporated into sports utility vehicles (SUVs) for providing protection against impact from lorries and trucks.

It will be appreciated that the first and second blocks 180, 190 in the impact protection structure are sized and shaped to provide optimal benefit in crash and impact situations. Moreover, their material is also selected, for example with regard to material density, to provide beneficial deformation properties, for example substantially non-elastic deformation properties, suitable for absorbing a degree of kinetic energy encountered in impact or crash situations. Moreover, the first and second blocks 180, 190 are designed taking into account a requirement for them to cooperate with one or more covers, or one or more grooves so that they remain correctly positioned to continue to absorb kinetic energy in an impact or crash situation. Optionally, one or more of the blocks 180, 190 can be fabricated from an expanded plastics material foam which has spatially varying properties, for example spatially varying density or material composition.

Although application of the blocks 180, 190 to provide the vehicle 10 with lateral impact protection is described in the foregoing, it will be appreciated that the blocks 180, 190 are susceptible to being adapted to provide the vehicle 10 with enhanced front impact protection and/or rear impact protection.

The second block 190 can optionally be omitted. Alternatively, the blocks 180, 190 can be modified so as to be a unitary component, for example the aforementioned unitary block 500, operable not only to at least partially abut an end region of the transverse member 70 but also to extend into a wall region whereat the sill 65 and the strengthening member 60 adjoin; the strengthening member 60 can optionally be provided with an access hole to assist with installation of the unitary block 500 during fabrication of the vehicle 10. Moreover, as elucidated earlier, at least one of the cover 160 and the strengthening bracket 170 can be optionally integrally incorporated into the first block 180.

It will be further appreciated that embodiments of the invention described in the foregoing are susceptible to being modified without departing from the scope of the invention as claimed by the accompanying claims.

Numerals included within parentheses in the accompanying claims are included to assist appreciation of subject matter claimed in the accompanying claims and are not intended to limit scope of the claims.

Expressions such as "comprise", "include", "consist of", "incorporate", "have" and "is" are intended to be construed non-exclusively, namely such expressions do not exclude other components, items or elements being present which are not explicitly described or disclosed. A reference to the plural is also to be construed to be a reference to the singular, and vice versa.

We claim:

1. A vehicular impact energy absorption block arrangement adapted to cooperate in operation at a region substantially between a first strengthening member and a second strengthening member to provide impact energy absorption thereat, the energy absorption block arrangement comprising:
   a first energy absorber block adapted to be mounted in a region between an end of the first member and a side of the second member to provide an abutment therebetween and comprising expanded plastics material foam operable to undergo deformation when subject to forces arising from an impact or crash of the vehicle, thereby at least partially absorbing the impact energy; and
   a second energy absorber block adapted to be located within the second member substantially adjacent to the first energy absorber block.

2. The absorption block arrangement as claimed in claim 1, wherein the first energy absorber block is operable to undergo substantially non-elastic deformation to at least partially absorb the impact energy.

3. The absorption block arrangement as claimed in claim 1, being adapted to cooperate with a cover arrangement for maintaining the absorption block arrangement substantially in position during impact.

4. The absorption block arrangement as claimed in claim 1, adapted to provide impact energy absorption when the first and second strengthening members are disposed substantially mutually perpendicularly.

5. A vehicular impact energy absorption block arrangement adapted to cooperate in operation at a region substantially between a first strengthening member and a second strengthening member to provide impact energy absorption thereat, the energy absorption block arrangement comprising a first energy absorber block comprising expanded plastics material foam operable to undergo deformation when subject to forces arising from an impact or crash of the vehicle, thereby at least partially absorbing the impact energy,
   wherein the absorption block arrangement is adapted to cooperate with a cover arrangement for maintaining the absorption block arrangement substantially in position during impact, and
   wherein the first energy absorber block is adapted to be maintained substantially in position during impact by a first cover included within the cover arrangement, and the second energy absorber block is adapted to cooperate with a strengthening element included in the cover arrangement at a periphery of the first cover for focusing an impact force borne by the first strengthening member during impact substantially at a centre of the second energy absorber block.

6. The absorption block arrangement as claimed in claim 5, wherein the strengthening element comprises a strengthening bracket.

7. A vehicular impact energy absorption block arrangement adapted to cooperate in operation at a region substantially between a first strengthening member and a second strengthening member to provide impact energy absorption thereat, the energy absorption block arrangement comprising a first energy absorber block comprising expanded plastics material foam operable to undergo deformation when subject to forces arising from an impact or crash of the vehicle, thereby at least partially absorbing the impact energy,
   wherein the absorption block arrangement is adapted to cooperate with a cover arrangement for maintaining the absorption block arrangement substantially in position during impact, and
   wherein the cover arrangement is fabricated from sheet metal which is cut and bent into required forms.

8. The absorption block arrangement as claimed in 7, wherein the expanded plastics material foam comprises one or more of: a polyolefin, such as a polyethylene and a polypropylene; a styrene resin such as polystyrene; an ABS resin; a polyester resin such as a polyethylene terephthalate and a polyamide; and a polypropylene.

9. The absorption block arrangement as claimed in claim 8, wherein the expanded plastics material foam has a density in a range of about 80 grammes/litre to about 100 grammes/litre in an expanded state.

10. The absorption block arrangement as claimed in claim 8, wherein the expanded polypropylene foam has a density of about 91 grammes/litre in an expanded state.

11. The absorption block arrangement as claimed in claim 7, wherein the expanded plastics material foam comprises air-filled or gas-filled pores therein.

12. The energy absorption block arrangement as claimed in claim 11, wherein the pores are substantially open pores.

13. The absorption block arrangement as claimed in claim 11, wherein the pores are substantially closed pores.

14. A vehicular impact energy absorption block arrangement adapted to cooperate in operation at a region substantially between a first strengthening member and a second strengthening member to provide impact energy absorption thereat, the energy absorption block arrangement comprising a first energy absorber block comprising expanded plastics material foam operable to undergo deformation when subject to forces arising from an impact or crash of the vehicle, thereby at least partially absorbing the impact energy, wherein the first energy absorber block has a generally tapered form, the tapered form being adapted to be thickest in a portion of the first energy absorber block which is adapted to abut onto the second strengthening member and thinnest in a portion of the first energy absorber block which is adapted to abut onto an end of the first strengthening member.

15. The absorption block arrangement as claimed in claim 14, wherein the first energy absorber block comprises a substantially cubic profile for abutting the first strengthening member.

16. The absorption block arrangement as claimed in claim 15, wherein the first energy absorber block has an overall length when installed along a longitudinal axis of a transverse member in a range of about 200 mm to about 300 mm, a height of about 200 mm and a width of about 200 mm.

17. A vehicular impact energy absorption block arrangement adapted to cooperate in operation at a region substantially between a first strengthening member and a second strengthening member to provide impact energy absorption thereat, the energy absorption block arrangement comprising:

a first energy absorber block comprising expanded plastics material foam operable to undergo deformation when subject to forces arising from an impact or crash of the vehicle, thereby at least partially absorbing the impact energy; and a second energy absorber block adapted to be mounted onto a mounting ridge of the second strengthening member.

18. The absorption block arrangement as claimed in claim 17, wherein the second energy absorber block is of generally rectangular or generally cubic form.

19. The absorption block arrangement as claimed in claim 17, wherein the second energy absorber block has a length in a range of 150 mm to 250 mm, a height in a range of 100 mm to 160 mm, and a width in a range of 50 mm to 120 mm, and more preferably the second energy absorber block has a length of about 174 mm, a height of about 129 mm and a width of about 78 mm.

20. A vehicular impact energy absorption block arrangement adapted to cooperate in operation at a region substantially between a first strengthening member and a second strengthening member to provide impact energy absorption thereat, the energy absorption block arrangement comprising:

a first energy absorber block comprising expanded plastics material foam operable to undergo deformation when subject to forces arising from an impact or crash of the vehicle, thereby at least partially absorbing the impact energy; and a cover arrangement adapted to maintain the absorption block arrangement substantially in position during impact.

* * * * *